United States Patent
Takeda

(10) Patent No.: US 12,502,780 B2
(45) Date of Patent: *Dec. 23, 2025

(54) TEACHING DEVICE AND TEACHING METHOD FOR LASER MACHINING

(71) Applicant: Fanuc Corporation, Yamanashi (JP)

(72) Inventor: Toshiya Takeda, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 425 days.

This patent is subject to a terminal disclaimer.

(21) Appl. No.: 18/014,813

(22) PCT Filed: Jul. 5, 2021

(86) PCT No.: PCT/JP2021/025344
§ 371 (c)(1),
(2) Date: Jan. 6, 2023

(87) PCT Pub. No.: WO2022/009844
PCT Pub. Date: Jan. 13, 2022

(65) Prior Publication Data
US 2024/0238975 A1    Jul. 18, 2024

(30) Foreign Application Priority Data

Jul. 10, 2020  (JP) ................. 2020-119359

(51) Int. Cl.
*B25J 9/16*  (2006.01)
*B23K 37/02*  (2006.01)

(52) U.S. Cl.
CPC ......... *B25J 9/1671* (2013.01); *B23K 37/0229* (2013.01); *G05B 2219/40393* (2013.01); *G05B 2219/45165* (2013.01)

(58) Field of Classification Search
CPC ............... B25J 9/1671; B23K 37/0229; G05B 2219/40393; G05B 2219/45165
(Continued)

(56) References Cited

U.S. PATENT DOCUMENTS

2006/0212170 A1* 9/2006 Nagatsuka ......... G05B 19/4207
                                                        700/245
2014/0358279 A1* 12/2014 Kimoto ................ B25J 19/0025
                                                        901/3
(Continued)

FOREIGN PATENT DOCUMENTS

CN          104889974 A       9/2015
CN          111185938 A       5/2020
(Continued)

OTHER PUBLICATIONS

International Search Report and Written Opinion for International Application No. PCT/JP2021/025344, dated Sep. 7, 2021, 7 pages.

*Primary Examiner* — Md Azad
(74) *Attorney, Agent, or Firm* — Buchanan Ingersoll & Rooney PC

(57) ABSTRACT

Provided is a teaching device whereby it is possible to avoid twisting a fiber connected to a galvano scanner beyond an allowable range. A teaching device for teaching a robot in a laser machining system, wherein the teaching device includes a path determination unit for determining a motion path for a robot on the basis the positions of a plurality of machining points set on an object; a simulation execution unit for executing a robot motion simulation in accordance with the determined motion path; a torsion amount evaluation unit for ascertaining the amount of torsion of an optical fiber by simulating the behavior of the optical fiber in accordance with the movement of the robot according to the motion simulation, and evaluating the torsion amount by comparing the torsion amount and a prescribed allowable range; and a robot orientation changing unit for changing the orientation of the robot so as to reduce the torsion amount for motion of the robot in which the torsion amount exceeds the prescribed allowable range.

10 Claims, 12 Drawing Sheets

(58) Field of Classification Search
USPC .......................................................... 700/166
See application file for complete search history.

(56) References Cited

U.S. PATENT DOCUMENTS

| | | | | |
|---|---|---|---|---|
| 2015/0112482 | A1* | 4/2015 | Kuwahara | G06N 20/00 |
| | | | | 901/50 |
| 2016/0132623 | A1* | 5/2016 | Takeda | G06F 30/20 |
| | | | | 703/7 |
| 2017/0364076 | A1* | 12/2017 | Keshmiri | G05B 19/41 |
| 2018/0222058 | A1* | 8/2018 | Mizobe | B25J 9/163 |
| 2019/0126404 | A1* | 5/2019 | Matsumoto | B23K 26/38 |
| 2019/0129381 | A1* | 5/2019 | Tanno | G01R 31/58 |
| 2019/0240833 | A1* | 8/2019 | Kimura | B25J 9/1664 |
| 2019/0321983 | A1* | 10/2019 | Chen | B25J 9/1633 |

FOREIGN PATENT DOCUMENTS

| | | |
|---|---|---|
| JP | H07182017 A | 7/1995 |
| JP | 10275007 A | 10/1998 |
| JP | H11099493 A | 4/1999 |
| JP | 2004074368 A | 3/2004 |
| JP | 2006247677 A | 9/2006 |
| JP | 2006281304 A | 10/2006 |
| JP | 2006344052 A | 12/2006 |
| JP | 2007021550 A | 2/2007 |
| JP | 2016087750 A | 5/2016 |
| JP | 2018086711 A | 6/2018 |
| JP | 2019081206 A | 5/2019 |
| JP | 2020035404 A | 3/2020 |
| JP | 2020075353 A | 5/2020 |

* cited by examiner

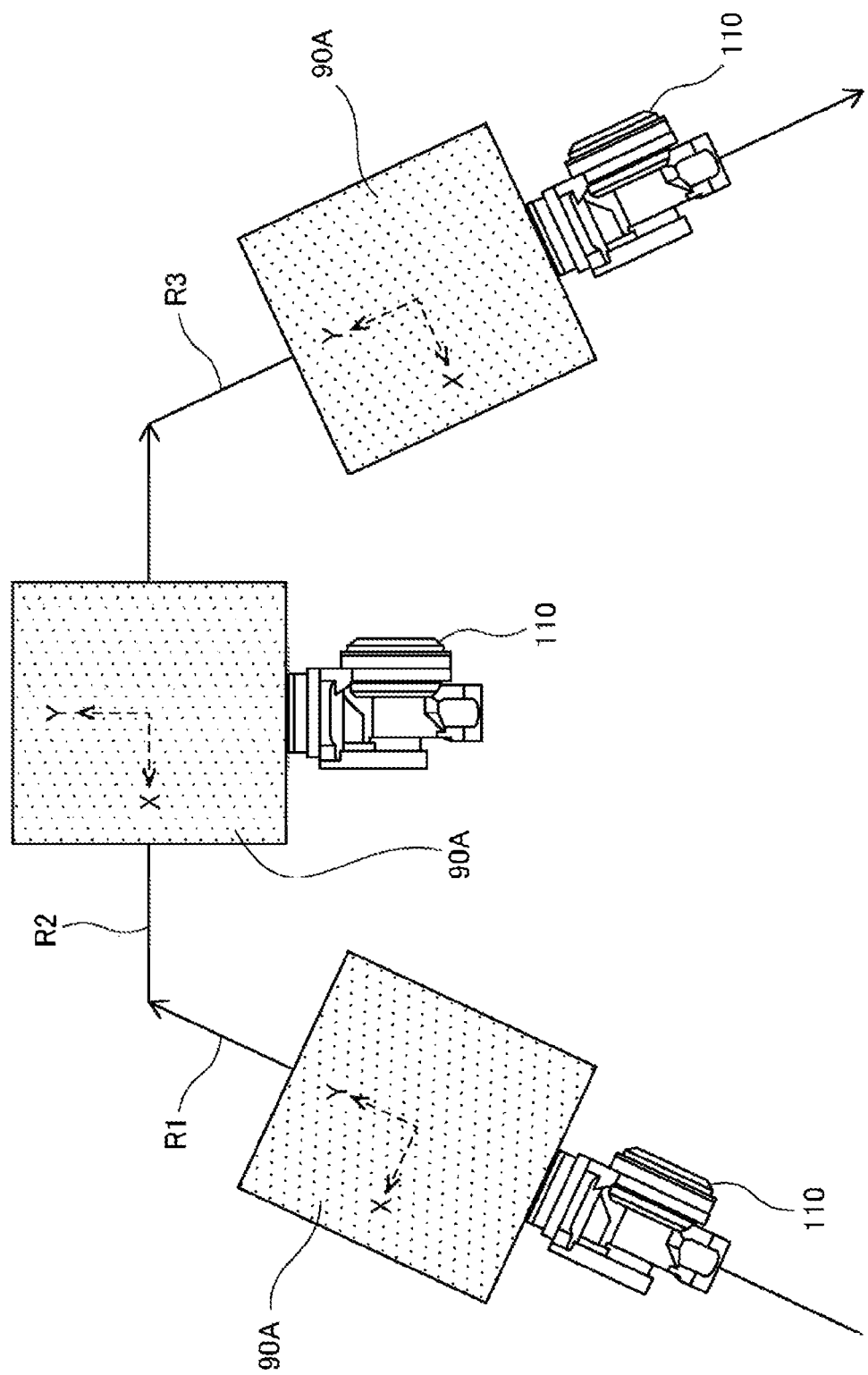

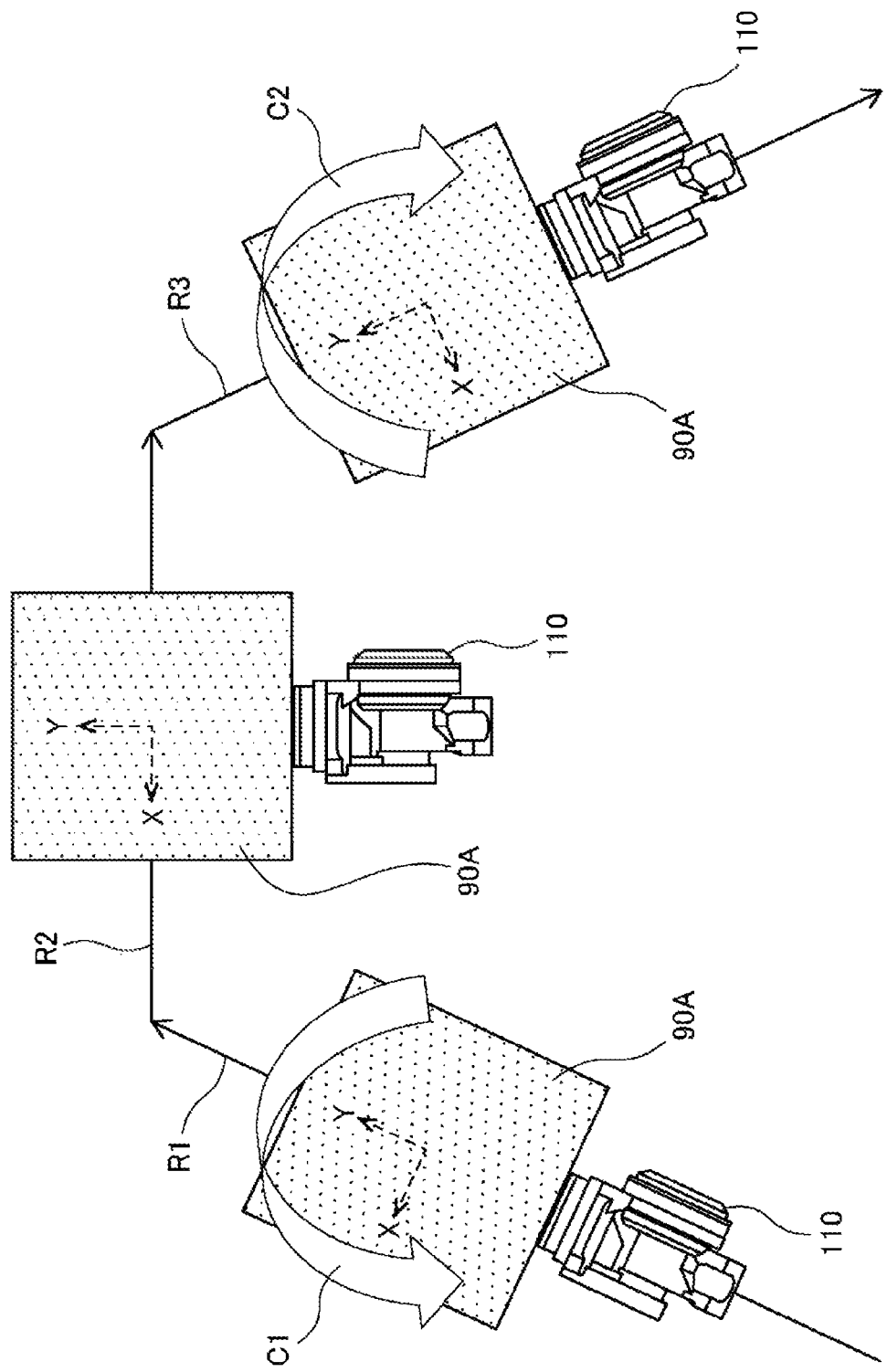

TEACHING DEVICE AND TEACHING METHOD FOR LASER MACHINING

CROSS REFERENCE TO RELATED APPLICATIONS

This is the U.S. National Phase application of PCT/JP2021/025344, filed Jul. 5, 2021, which claims priority to Japanese Patent Application No. 2020-119359, filed Jul. 10, 2020, the disclosures of these applications being incorporated herein by reference in their entireties for all purposes.

FIELD OF THE INVENTION

The present invention relates to a teaching device and a teaching method for laser machining, for teaching a laser machining system including a robot.

BACKGROUND OF THE INVENTION

A laser machining system has been proposed in which a workpiece is irradiated with a laser beam from a machining head mounted on an arm tip of a robot and is machined by such as welding (e.g., Patent Literatures 1 to 5).

PATENT LITERATURE

Patent Literature 1: JP 2020-35404 A
Patent Literature 2: JP 2006-344052 A
Patent Literature 3: JP 2018-086711 A
Patent Literature 4: JP 2006-281304 A
Patent Literature 5: JP 2007-21550 A

SUMMARY OF THE INVENTION

In a laser machining system using a galvano scanner as a laser machining head, an operation path of a robot is generated by a teaching device based on the placement of a spot point so that the spot point is placed in the irradiation range of the galvano scanner attached to the robot. When the robot is operated according to the generated operation path, the fiber connected to the galvano scanner may be twisted beyond the allowable range depending on the orientation of the galvano scanner.

An aspect of the present disclosure is a teaching device for teaching an operation of a robot of a laser machining system including a laser machining head with an optical fiber connected, and the robot for moving the laser machining head. The teaching device includes: a path determination unit configured to determine an operation path of the robot based on positions of a plurality of machining points set to an object; a simulation execution unit configured to execute an operation simulation of the robot according to the operation path determined; a torsion amount evaluating unit configured to calculate an amount of torsion of the optical fiber by simulating a behavior of the optical fiber according to a movement of the robot by the operation simulation, and to evaluate the amount of torsion by comparing the amount of torsion with a predetermined allowable range; and a robot orientation changing unit configured to change an orientation of the robot in a manner to reduce the amount of torsion, with respect to an operation of the robot having the amount of torsion exceeding the predetermined allowable range.

Another aspect of the present disclosure is a teaching method for teaching operation of a robot of a laser machining system that includes a laser machining head connecting an optical fiber, and the robot for moving the laser machining head. The teaching method includes: determining an operation path of the robot based on positions of a plurality of machining points set to an object; executing an operation simulation of the robot according to the operation path determined; calculating a torsion amount of the optical fiber by simulating a behavior of the optical fiber according to a movement of the robot by the operation simulation and evaluating the torsion amount by comparing the torsion amount with a predetermined allowable range; and changing an orientation of the robot in a manner to reduce the torsion amount, with respect to the operation of the robot having a torsion amount exceeding the predetermined allowable range.

According to the above configuration, teaching in the laser machining system can be performed so that the torsion of the optical fiber is within an allowable range.

From the detailed description of an exemplary embodiment of the present invention illustrated in the accompanying drawings, these objects, features, and advantages of the present invention as well as other objects, features, and advantages of the present invention will become more apparent.

BRIEF DESCRIPTION OF DRAWINGS

FIG. 7 illustrates an example in a case in which the robot's orientation when moving on an operation path is determined so that the robot's movement direction is along the sides of scanner's irradiation range.

FIG. 11 is a diagram describing a change in the robot's orientation for eliminating the amount of torsion.

DETAILED DESCRIPTION OF EMBODIMENTS OF THE INVENTION

Figure 1:
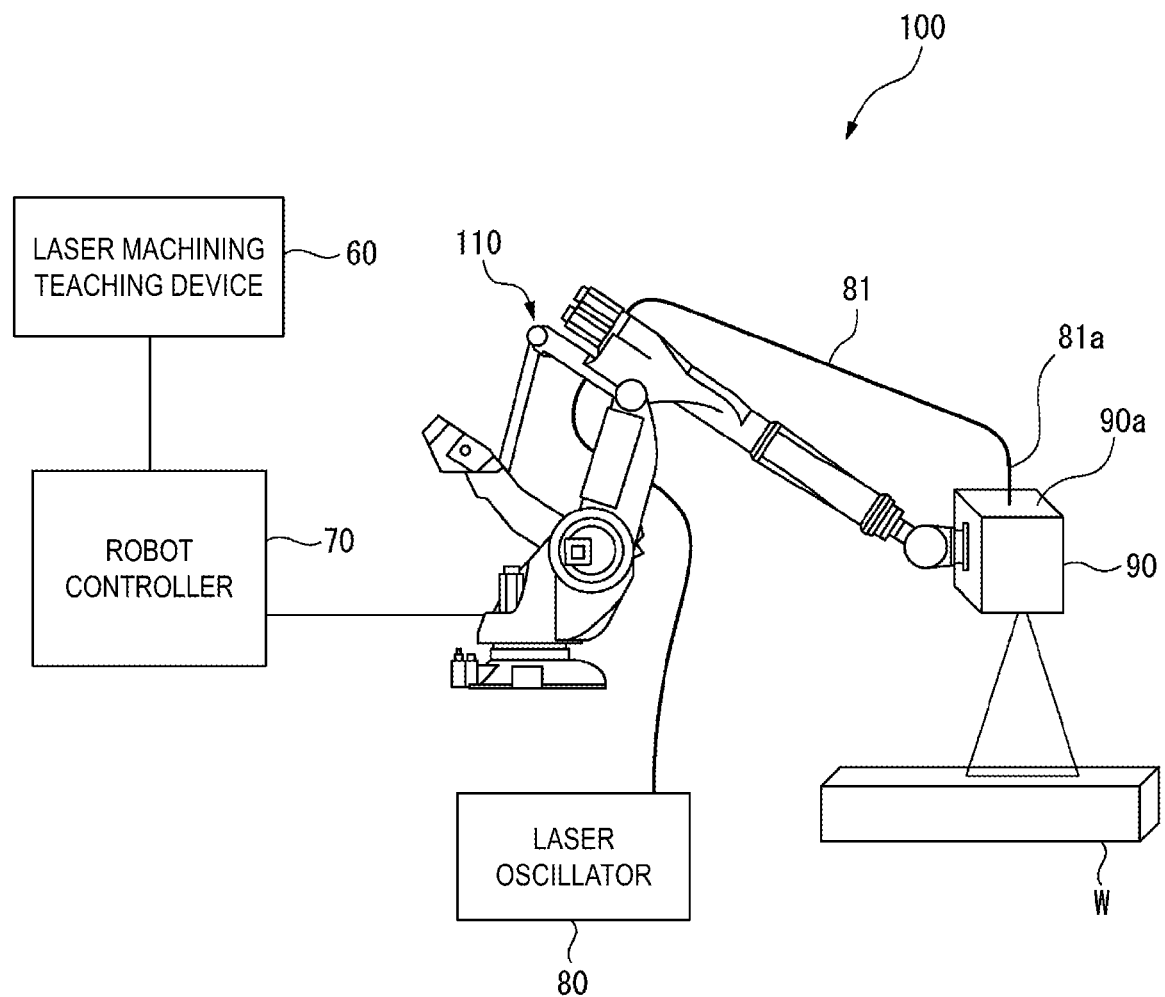
FIG. 1 is an overall configuration diagram of a laser machining system including a laser machining teaching device according to an embodiment.

An embodiment of the present disclosure will now be described with reference to the drawings. In the drawing to be referenced, like components or functions are denoted by common reference numerals. For ease of understanding, these drawings have been scaled appropriately. The embodiment illustrated in the drawings is an example for implementing the present invention, and the present invention is not limited to the embodiment illustrated in the drawings.

FIG. 1 is an overall configuration diagram of a laser machining system 100 including a laser machining teaching device 60 according to an embodiment. The laser machining system 100 is configured as a so-called cooperative type remote laser machining system in which a laser beam is scanned, to machine each machining point on a workpiece W, while moving a galvano scanner (hereinafter simply referred to as a scanner) 90 as a laser machining head attached to a predetermined movable portion (arm tip part in the present embodiment) of a robot 110. In the configuration example of FIG. 1, the laser machining system 100 includes the robot 110, a robot controller 70 for controlling the robot 110, a laser oscillator 80, and the laser machining teaching device 60. The robot 110 is a vertical articulated robot in the configuration example of FIG. 1, but other types of robots may be used. Further, a laser scanner other than the galvano scanner may be used. The scanner 90 has a function of scanning the laser beam sent from the laser oscillator 80 via an optical fiber 81 in an XY direction by driving a mirror, and a function of moving a laser spot in the Z direction by driving a lens in a Z direction.

The optical fiber 81 is connected to the center portion of a top face 90a in a state where the connection end portion 81a connected to the scanner 90 is substantially perpendicular to the top face 90a of the scanner 90.

The laser machining teaching device 60 is a programming device that generates operation programs for the robot 110 and the scanner 90 on an offline basis. The laser machining teaching device 60 may be configured as a general PC including hardware constituent element such as a CPU, a ROM, a RAM, a hard disk, an input device, a display device, and a network interface. As the laser machining teaching device 60, various information processing apparatuses such as a desktop type PC, a notebook type PC, and a portable information terminal can be used. In the configuration example illustrated in FIG. 1, the laser machining teaching device 60 is connected to the robot controller 70 via the network, and the operation programs of the robot 110 and the scanner 90 created by the laser machining teaching device 60 can be transferred from the laser machining teaching device 60 to the robot controller 70 via the network.

The robot controller 70 includes an operation controller 71 for controlling the robot 110 in accordance with the operation programs. The robot controller 70 may have a configuration as a general computer including a CPU, a ROM, a RAM, a storage device, or the like. The operation program for the scanner 90 generated by the laser machining teaching device 60 is transferred from the laser machining teaching device 60 to a controller 91 of the scanner 90 via the robot controller 70. The controller 91 of the scanner 90 is operable according to the loaded operation program. The controller 91 of the scanner 90 may be configured as a general computer including a CPU, a ROM, a RAM, a storage device, or the like.

The laser machining system 100 can perform various laser machining such as welding, cutting, or the like. In the following description, it is assumed that the laser machining system 100 performs welding. As will be described in detail below, the laser machining teaching device 60 corrects the orientation of the robot 110 so as not to cause torsion of the optical fiber 81, by executing operation simulation of the robot 110 and evaluating the amount of torsion of the optical fiber 81 accompanying the movement of the robot 110, in the process of creating an operation program for welding spot points to be welded.

Figure 2:
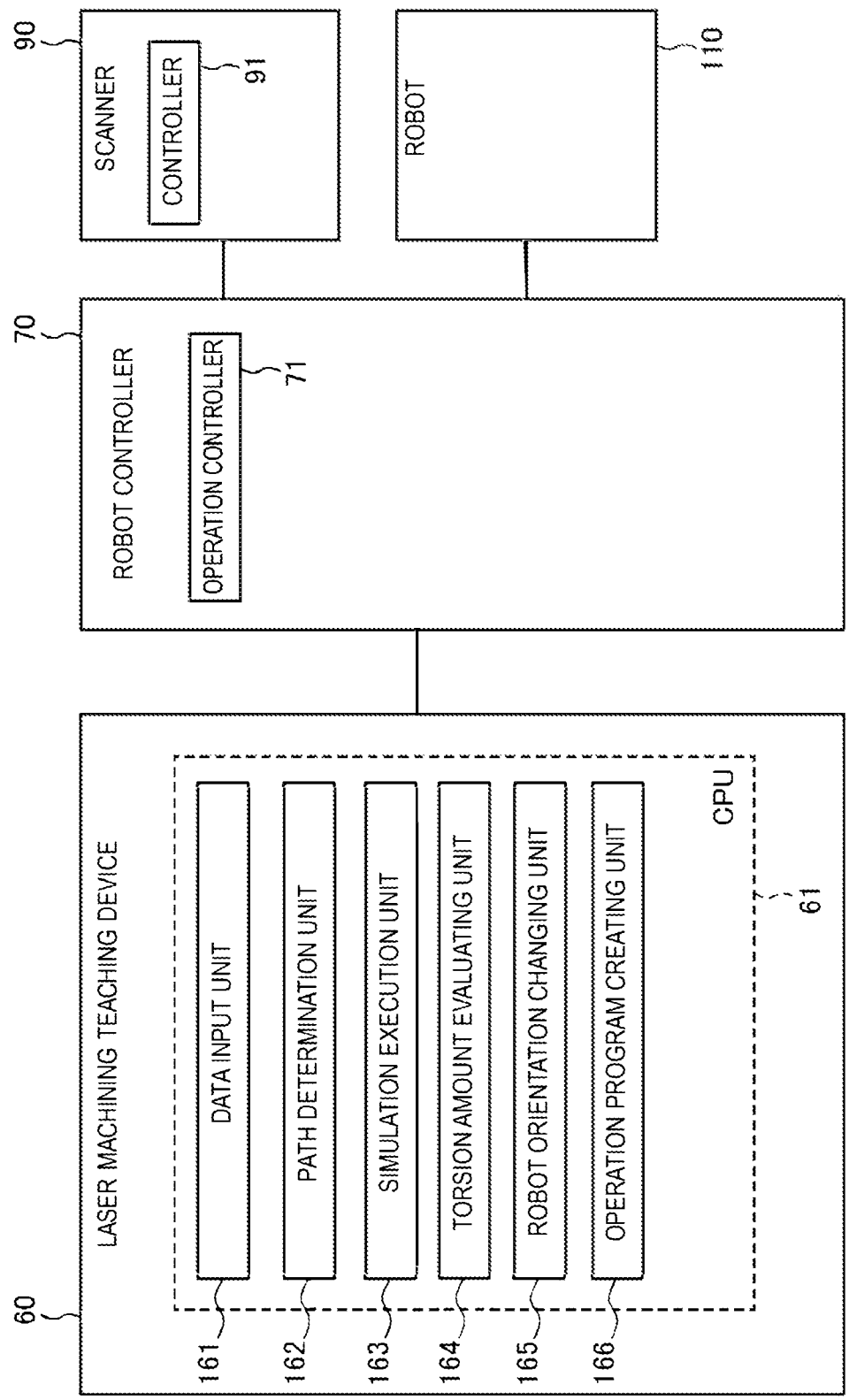
FIG. 2 is a diagram illustrating a functional configuration of a laser machining teaching device, a robot controller, and a scanner.

FIG. 2 is a diagram illustrating a functional configuration of the laser machining teaching device 60, the robot controller 70 and the scanner 90. The functional block of the laser machining teaching device 60 illustrated in FIG. 2 may be implemented by the CPU 61 of the laser machining teaching device 60 executing software, or may be implemented by a dedicated hardware such as an application specific integrated circuit (ASIC). As illustrated in FIG. 2, the laser machining teaching device 60 includes a data input unit 161, a path determination unit 162, a simulation execution unit 163, a torsion amount evaluating unit 164, a robot orientation changing unit 165, and an operation program creating unit 166.

The data input unit 161 acquires various types of data necessary for the operation program creation processing including the spot points for welding, a welding time and a welding pattern of each spot point, and model data such as the robot 110, and the workpiece W. The various types of data may be stored in advance in a storage device in the laser machining teaching device 60, or may be input to the laser machining teaching device 60 via an operating part. Alternatively, the various types of data may be input to the laser machining teaching device 60 from an external device via the network.

The path determination unit 162 performs grouping of the spot points obtained by the data input unit 161, determines an operation path through each group, and determines an operating speed so that all the spot points for welding can be welded, and the cycle time can be shortened.

The simulation execution unit 163 executes an operation simulation of the robot 110 using the operation path and the operating speed determined by the path determination unit 162.

The torsion amount evaluating unit 164 calculates the amount of torsion of the optical fiber 81 by simulating the behavior of the optical fiber 81 according to the movement of the robot 110 by the operation simulation, and evaluates the amount of torsion by comparing the amount of torsion with a predetermined allowable range.

The robot orientation changing unit 165 changes the orientation of the robot 110 so as to reduce the amount of torsion for the operation of the robot 110 having the amount of torsion exceeding the predetermined allowable range.

The operation program creating unit 166 creates operation programs for the robot 110 and the scanner 90 using data such as the operation path, the operating speed, and a welding period of each spot point, to which various adjustments have been made. As a result, an operation path (operation program) of the robot 110 and an operation program of the scanner 90, for performing a predetermined welding operation are generated so that the amount of torsion of the optical fiber 81 can be kept within an allowable range.

Figure 3:
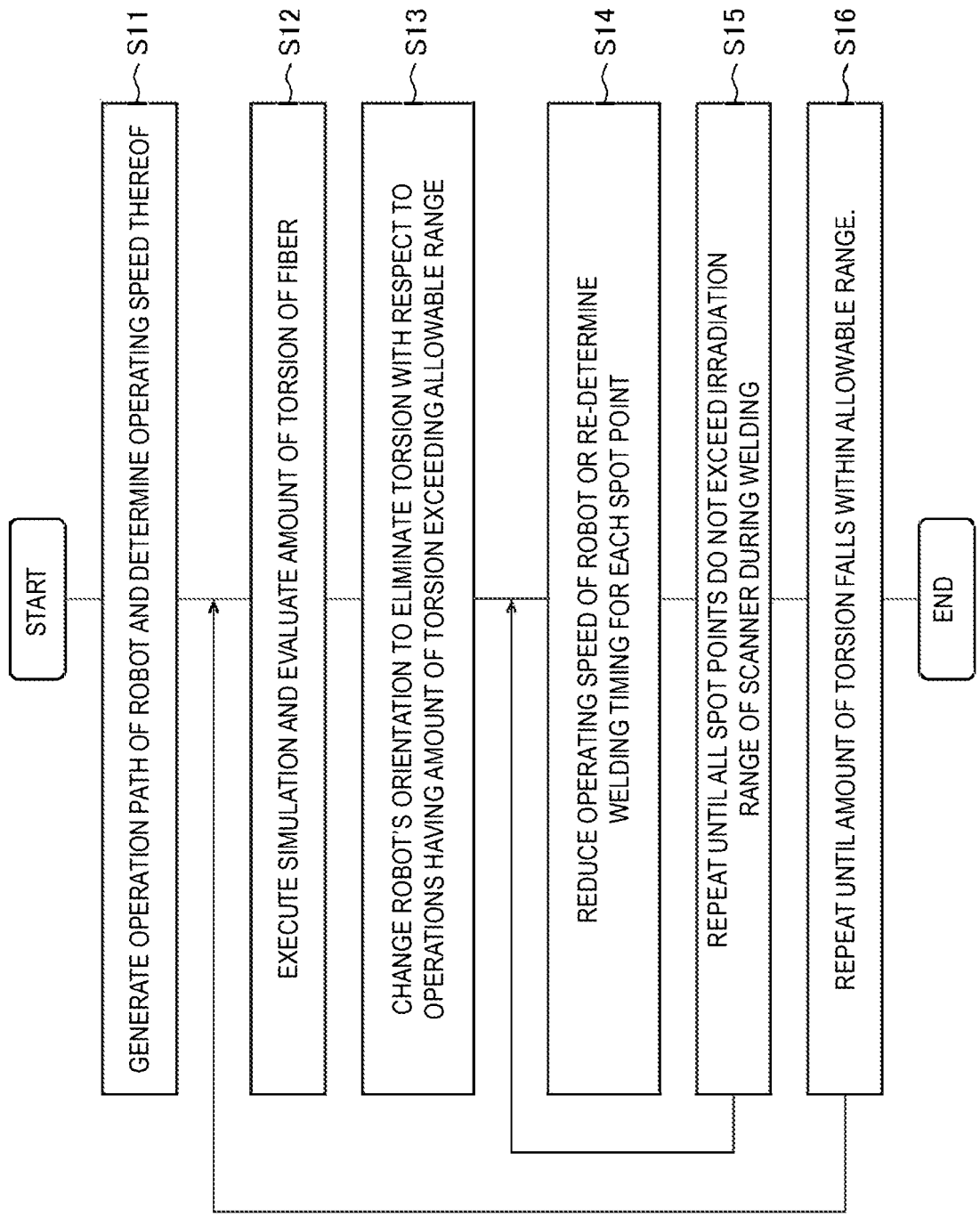
FIG. 3 is a flowchart illustrating operation program creation processing.

FIG. 3 is a flowchart illustrating an operation program creation processing for creating an operation program for executing a predetermined welding operation while keeping the amount of torsion of the optical fiber 81 within the allowable range. The operation program creation processing illustrated in FIG. 3 is executed under the control of the CPU 61 of the laser machining teaching device 60. At the start of the operation program creation processing, it is assumed that various types of data necessary for the operation program creation processing including the spot points for welding, welding time of each spot point, welding pattern, model data such as the workpiece W, are already input through the data input unit 161.

Figure 4:
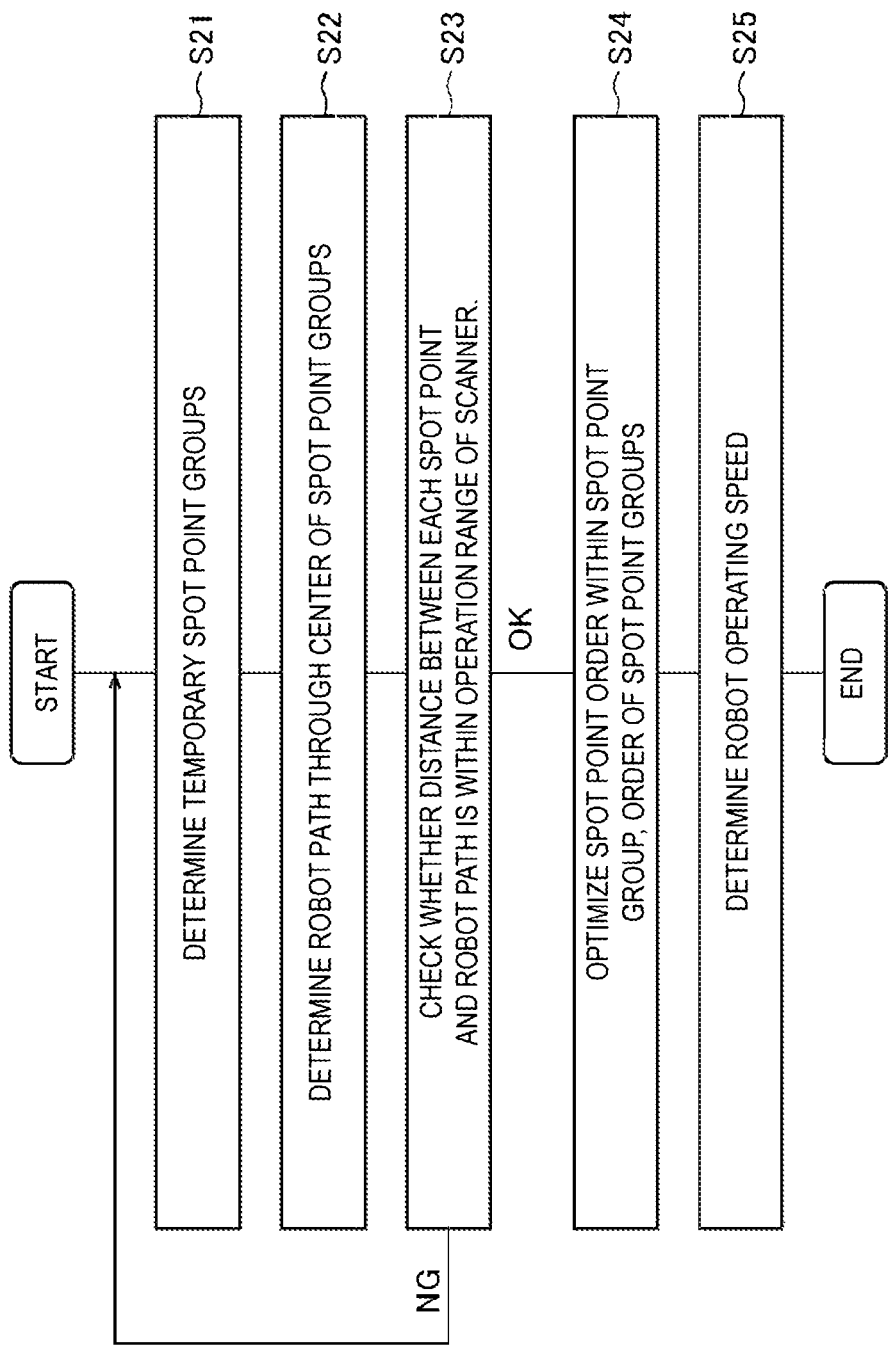
FIG. 4 is a flowchart illustrating processing of generating an operation path and determining an operating speed.

When the operation program creation processing is started, first, the laser machining teaching device 60 (the path determination unit 162) executes processing for generating an operation path of the robot 110 and determining an operating speed of the robot 110 (step S11). FIG. 4 is a flowchart illustrating the processing of generating the operation path and determining the operating speed in step S11. As an example, it is assumed that the operation path is generated for spot points of 201 to 215 illustrated in FIG. 5. First, in step S21, the spot points of 201 to 215 is divided into temporary spot point groups. Here, one group defines a plurality of spot points at which welding is performed while the robot 110 is operated with one operation instruction. In one group, the robot 110 operates with one operation instruction while the scanner 90 performs a scan operation to weld each spot point belonging to the group. In one operation instruction, the robot 110 operates linearly at a constant speed. Here, as an example, it is assumed that the spot points of 201 to 215 is temporarily divided into three spot point groups G1 to G3.

In step S22, for each group G1 to G3, paths of the robot 110 passing through each center of the spot point groups are determined. The line passing through the center of the spot point group is determined, for example, by a least squares method. Referring to the group G1 as an example, a path R1 is acquired as a line allowing the sum of squares of distances from respective spot points 201 to 205 to the path R1 to be minimized. Since the spot point positions are positions in three-dimensional space, each spot point 201 to 205 is actually distributed in three-dimensional space. However, a plane passing through the average positions of respective spot point positions is defined, and the above-described path is determined by assuming that each spot point is at a position where each spot point is projected onto the plane. The plane passing through the average positions of respective spot point positions can be determined, for example, using the least squares method or Newell's algorithm. It is assumed that the path R1, R2, and R3 are determined to be the paths of spot point groups G1, G2, and G3, respectively, by the processing in step S22. Note that the path may be determined to be a path in which a foot of a perpendicular line extending from the irradiation position of a laser beam to the plane defining the spot point groups moves on the plane.

Next, in step S23, for each spot point group, it is confirmed whether each spot point is within a work range (the irradiation range) of the scanner 90. For example, with regard to the spot point group G1, the confirmation in step S23 can be made by determining whether a distance from each spot point 201 to 205 to the path R1 is within the work range of the scanner 90. When a spot point that is outside the work range of the scanner 90 is found (when the result of S23 is negative), grouping is redone (step S21).

Figure 5:
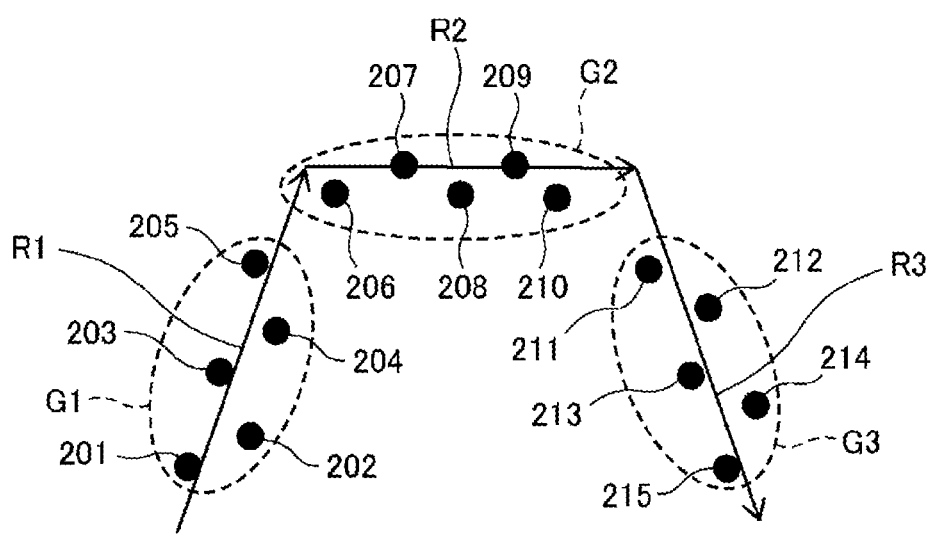
FIG. 5 is a diagram for describing grouping of spot points and determination of a path.

Next, in step S24, the movement order between the spot point groups and the spot point order within each spot point group are optimized. Here, the movement order between the groups and the spot point order within each spot point group are determined so that the total movement distance between the groups is minimized. Various types of techniques known in the art for solving a so-called "traveling salesman problem" can be used as techniques for determining the order of movement allowing the total movement distance between the spot point groups to be minimized. It is assumed that the spot point groups G1 to G3 and paths R1 to R3 are determined for the spot points 201 to 215 as illustrated in FIG. 5 by the above-described processing. As a method for determining the operation path for the spot points, various types of methods known in the art (e.g., the method for determining the operation path described in JP 2020-35404 A) may be used.

Next, in step S25, an operating speed of the robot 110 is determined. The determination of the operating speed of the robot 110 may be performed by the following procedure.

(Procedure 1) Determine the temporary operating speed for each spot point group.
(Procedure 2) Perform a robot operation simulation using the determined path and the operating speed.
(Procedure 3) Calculate the period during which each spot point can be welded on the robot operation path.
(Procedure 4) Determine the position and the period for welding each spot point.
(Procedure 5) Optimize the operating speed.

Each procedure will be described in detail. In Procedure 1, the temporary speed may be set uniformly for all spot point groups to a low speed at which the spot points of each spot point group can be welded without any problem. Alternatively, a representative speed based on the experience value may be uniformly set for each spot point group.

Next, in Procedure 2, the operation simulation of the robot 110 is executed using the paths (paths R1 to R3) determined, as described above, and the temporary operating speed. Position data (hereinafter also referred to as operation path) for each interpolation period of the robot is acquired by execution of the operation simulation.

Next, in Procedure 3, a period (hereinafter referred to as a weldable period) corresponding to a range in which each spot point can be welded on the operation path of the robot 110 is calculated using the operation path of the robot 110 obtained by the operation simulation of the robot 110. Specifically, first, the position (specifically, for example, the position of the focusing lens in the scanner 90) of the scanner 90 attached to the arm tip of the robot 110 is determined based on the position on the operation path of the robot 110, and the path of the laser beam connecting the position of the scanner 90 and the position of the spot point is determined. At this time, it may be determined that the path of the laser beam is weldable when the following conditions are satisfied:

(1) the path of the laser beam does not interfere with a workpiece and a jig;
(2) the path of the laser beam is within the work range of a scanner; and
(3) the irradiation angle, which is the angle between the normal direction of the workpiece at the spot point position and the laser beam, is within a predetermined allowable range. The period corresponding to the range in which the path of the laser beam is determined to be continuously weldable on the operation path is the weldable period for each spot point.

Next, in Procedure 4, the position and the time for welding each spot point are determined by using the weldable period for each spot point. Here, the welding time of each spot point is considered as a first condition, and the time for welding is determined so that the welding time of each spot point is surely satisfied without depending on the start time of the weldable period of each spot point. For example, it is assumed that there are two spot points A, B having the same welding time of 1 second, and the weldable period of the spot point A is from 1 second to 4 seconds from the start of operation, and the weldable period of the spot point B is from 1.1 seconds to 2.1 seconds from the start of operation. In this case, the spot point A can be welded first, but when the spot point A is welded from 1 second to 2 seconds, the spot point B cannot be welded. In such a case, the spot point B is welded from 1.1 seconds to 2.1 seconds, and the spot point A is welded from 2.1 seconds to 3.1 seconds.

Next, in Procedure 5, the operating speed is adjusted and optimized so that all spot points can be welded and the cycle time is shortened. For example, the operating speed of the robot 110 for all spot point groups may be set to the same value, and the operating speed may be decreased until welding is possible for all spot points, and then the operating speed may be increased for each spot point group. Thus, the processing of determining the operating speed in step S25 is completed.

In the processing of determining the operation path and the operating speed in step S11, the path determination unit 162 may determine the orientation of the robot 110 (i.e., the orientation of the scanner 90) as follows. Assume that the robot 110 welds a certain spot point while operating. While the robot 110 is emitting laser beam to weld a spot point, the spot point must remain in the irradiation range of the scanner 90. Assuming that the irradiation range of the scanner 90 is rectangular, when the operating direction of the robot 110 is along either the longitudinal side or the lateral side of the irradiation range, the distance that the robot 110 can move during the welding time of the spot point becomes longer, and the operating speed of the robot 110 can be further increased. Further, the cycle time can be shortened. This will be described with reference to FIGS. 6A and 6B.

Figure 6A:
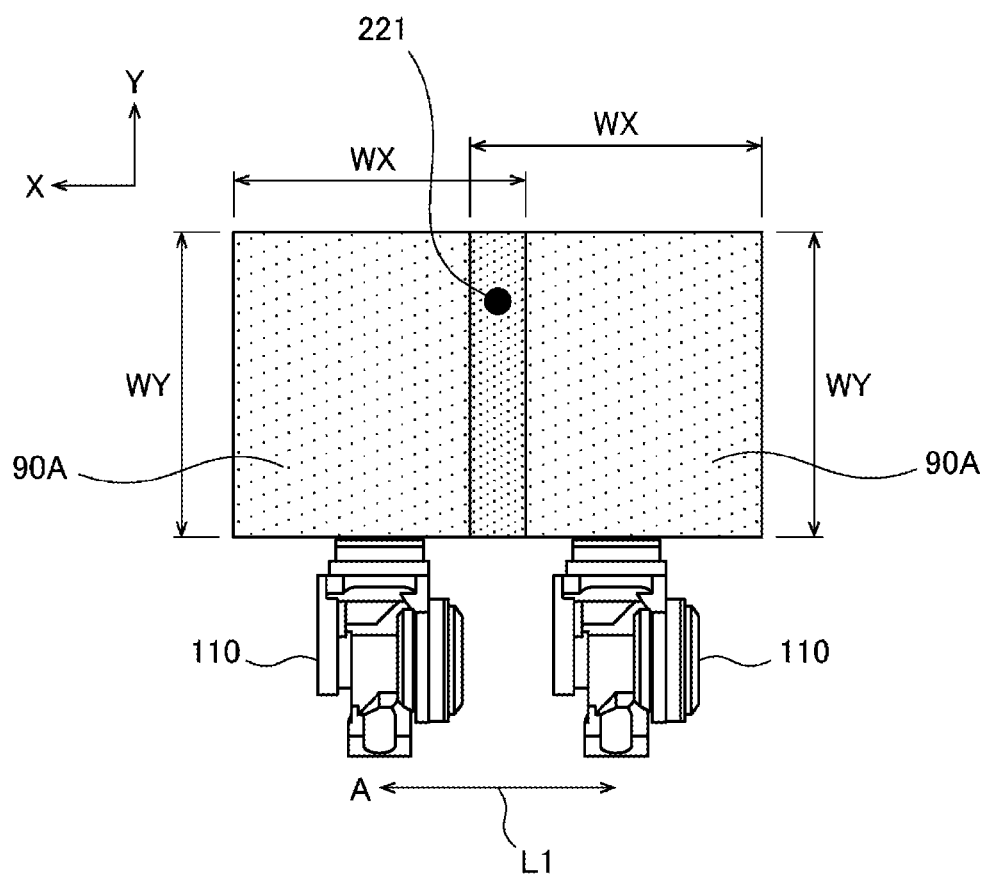
FIG. 6A is a diagram illustrating a state in which a robot moves along the sides of an irradiation range.
Figure 6B:
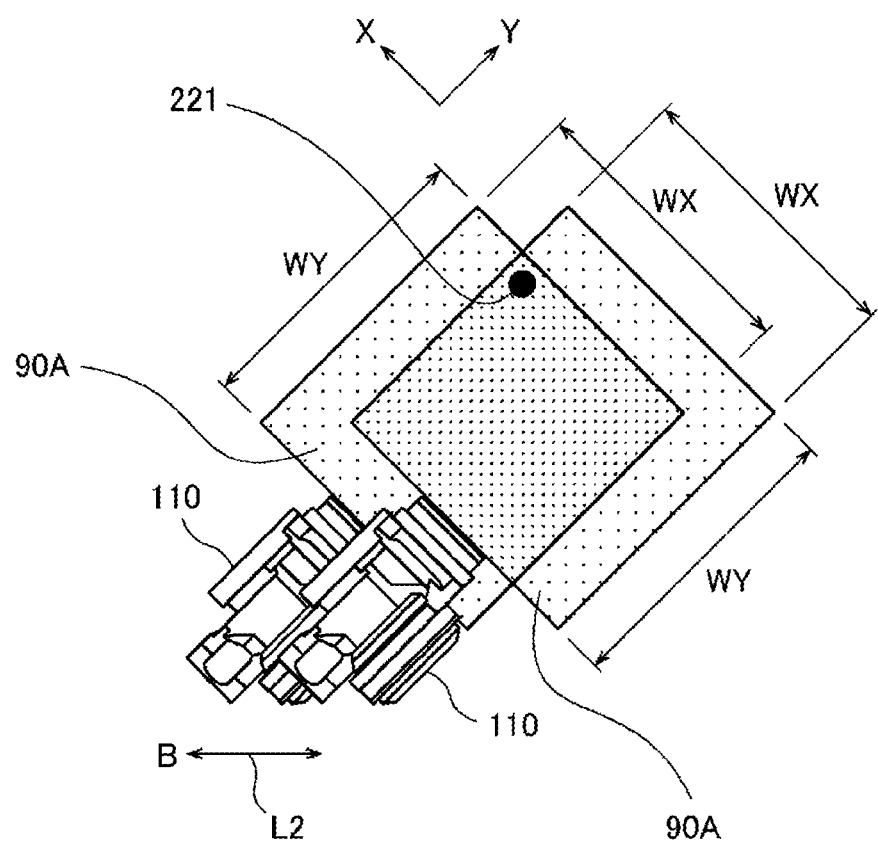
FIG. 6B is a diagram illustrating a state in which the movement direction of a robot is not along the irradiation range.

In FIGS. 6A and 6B, the irradiation range (scan range) of the scanner 90 attached to the wrist of the robot 110 is indicated by a reference numeral 90A. FIGS. 6A and 6B illustrate an XY coordinate system with reference to the wrist of the robot 110 (i.e., with reference to the scanner 90). The irradiation range 90A is a rectangular region having a width WX in the X-axis direction and a width WY in the Y-axis direction. In FIG. 6A, it is assumed that the scanner 90 is moved in a direction parallel to the X-axis (A direction in FIG. 6A) when a spot point 221 is irradiated with a laser. In this case, the movement direction A of the robot 110 is oriented along the side (X-axis direction) of the irradiation range 90A, so that the robot 110 can move a distance L1 during the welding time of the spot point 221.

On the other hand, it is assumed that the wrist portion (i.e., the scanner 90) of the robot 110 moves in the arrow B direction in the drawing in the orientation illustrated in FIG. 6B. In this case, the movement direction of the robot 110 is not along the side direction of the irradiation range 90A. Therefore, the distance by which the robot 110 can move during the welding time when the robot 110 welds the spot point 221 is a distance L2. The distance L2 is shorter than the distance L1 (L2<L1). From the above, it can be understood that when the movement direction of the robot 110 is along one of the sides (X-axis or Y-axis) of the irradiation range of the scanner 90, the distance that the robot 110 can move during the welding time of a spot point becomes longer, i.e., the operating speed of the robot 110 can be increased.

FIG. 7 illustrates an example in which the orientation of the robot 110 (the scanner 90) in the moving paths R1 to R3 is determined so that the movement direction of the robot 110 is along one of the sides (X-axis or Y-axis) of the irradiation range of the scanner 90. In the example of FIG. 7, in the path R1, the orientation of the wrist portion of the robot 110 is determined so that the Y-axis of the irradiation range 90A is parallel to the path R1, in a path R2, the orientation of the wrist portion of the robot 110 is determined so that the X-axis of the irradiation range 90A is parallel to the path R2, and in a path R3, the orientation of the wrist portion of the robot 110 is determined so that the Y-axis of the irradiation range 90A is parallel to the path R3.

When the orientation of the wrist (the scanner 90) of the robot 110 is determined, as described above, the scanner 90 rotates about the vertical axis. Rotation of the scanner 90 about the vertical axis may cause optical fiber 81 to twist. In step S12 of the operation program determination processing (FIG. 3), the torsion amount evaluating unit 164 evaluates the amount of torsion of the optical fiber 81 by physical simulation. A physical simulation of the amount of torsion of the optical fiber 81 as a wire body will be described with reference to FIGS. 8 to 10.

Figure 8:
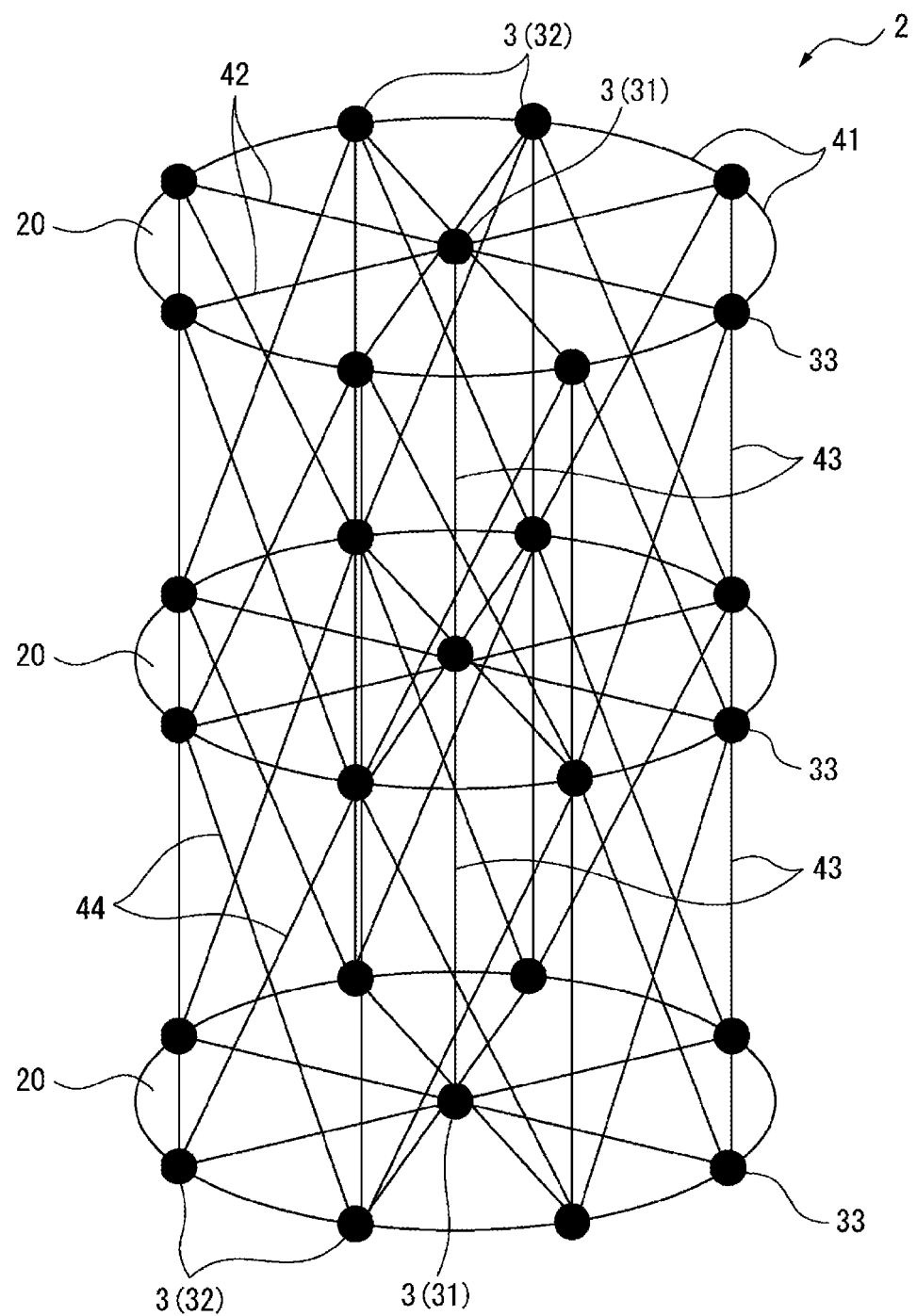
FIG. 8 is a perspective view illustrating an example of a wire body model used in a behavior simulation of a wire body.

FIG. 8 is a perspective view illustrating an example of a wire body model 2 having a circular cross section. As illustrated in FIG. 8, the wire body model 2 is formed by a plurality of mass points 3 and a plurality of spring elements 4 connecting the mass points 3 to each other. Each of the plurality of mass points 3 includes a first mass point 31 and a second mass point 32 disposed on a plane 20 perpendicular to the longitudinal direction of the wire body. The first mass point 31 is located in the center portion of the plane 20 radially. The second mass points 32 are arranged circumferentially at equal intervals around the first mass point 31 and define the outer circumferential surface of the wire body. Along the longitudinal direction of the wire body, the first mass points 31 and the second mass points 32 are arranged at equal intervals, respectively. Each mass point 3 has mass information, three-dimensional position information (position data), and three-dimensional velocity information. The mass of each mass point 3 may be defined as the mass of the wire body divided by the number of mass points.

The spring element 4 includes: a first spring 41 connecting the second mass points 32 to each other arranged on the circumference of the same plane 20; a second spring 42 radially extending from the first mass point 31 on the plane 20 and connecting the first mass point 31 and each of the second mass points 32; a third spring 43 along the longitudinal direction of the wire body sequentially connecting the first mass points 31 to each other and the second mass points 32 to each other arranged in a row, respectively; and a fourth spring 44 diagonally connecting the second mass points 32 to each other arranged in the longitudinal direction. The first spring 41 and the second spring 42 represent the radial elasticity of the wire body, and the third spring 43 and the fourth spring 44 represent the longitudinal elasticity of the wire body.

The torsion amount evaluating unit 164 sets a plurality of noted points 33 on the wire body model 2 to grasp the torsion state of the wire body. In FIG. 8, the noted points 33 are set in a circumferential part of the wire body model, more specifically, in a row of the second mass points 32 along the longitudinal direction of the wire body sequentially connected via the respective third spring elements 43. The noted points 33 can be arbitrarily set by the user on the wire body model 2 through the operation section of the laser machining teaching device 60.

The torsion amount evaluating unit 164 operates the robot model according to a predetermined operation program to simulate the behavior of the wire body associated with the operation of the robot. That is, in accordance with the operation of the robot model, the elastic force, gravity, and damping force from the spring element 4 acting on each mass point 3 of the wire body model 2 are calculated for each predetermined unit time, and a simulation (physical simulation) is executed such that the position of each mass point 3 is changed for each unit time.

In this case, when the mass point 3A and the mass point 3B are connected to each other via the spring element 4, the elastic force F1 of the spring element 4 acting on the mass point 3A can be calculated by the following equation (I):

$$F1 = \text{(unit vector from } 3A \text{ to } 3B) \times \text{spring constant} \times \text{spring expansion/contraction amount} \quad \text{(I)}$$

In the above equation (I), the expansion/contraction amount (spring expansion/contraction amount) of the spring element 4 is defined as a value obtained by subtracting the natural length of the spring element 4 from the length of the spring element 4 in a certain state. The natural length of the spring element 4 corresponds to the distance between mass points 3A and 3B in the natural state without expanding and bending of the wire body model 2.

As the damping force of the spring element, there are a damping force F2 for suppressing the vibration of the spring and a damping force F3 for suppressing the translational motion of each mass point 3, which can be calculated by the following equations (II) and (III), respectively:

$$F2 = \text{(inner product of } v \times v) \times \text{damping coefficient of oscillation;} \quad \text{(II)}$$

$$F3 = \text{velocity of each mass point} \times \text{damping coefficient of translational motion} \quad \text{(III)}$$

In equation (II) above, v is a unit vector of (the velocity of mass point 3B—the velocity of mass point 3A). The damping forces F2 and F3 each act to slow the spring movement.

The gravity F4 acting on each mass point 3 can be calculated by the following equation (IV):

$$F4 = \text{unit vector in the gravity direction} \times \text{gravitational acceleration} \times \text{mass of the mass point} \quad \text{(IV)}$$

When the mass point 3 of the wire body model 2 collides with an interference surface, a repulsive force acts on the mass point 3. With this in mind, the repulsive force acting on the mass point may be calculated as well as the elastic force, the gravity, and the damping force. In this case, the value of the component of the velocity of the mass point at the time of collision in the direction perpendicular to the surface of the collided surface becomes a value obtained by multiplying the velocity before collision by the coefficient of restitution and inverting the sign. At this time, the repulsive force can be calculated by multiplying the acceleration, obtained by dividing the change in velocity before and after the collision by the unit time, by the mass of the mass point.

The torsion amount evaluating unit 164 further calculates the total of forces F1 to F4 acting on each mass point 3, and then calculates an acceleration of the mass point 3 by dividing the total by the mass. The change amount of the speed of the mass point 3 is calculated by the acceleration× unit time, and the change amount is added to the speed of the mass point 3 to calculate the speed of the mass point 3. Further, the position of the mass point 3 is calculated by calculating the displacement amount of the mass point 3 by multiplying the velocity by the unit time and adding the calculated displacement amount to the three-dimensional position data of the mass point 3.

In other words, the torsion amount evaluating unit 164 simulates the behavior of the wire body by changing the position of the mass point 3 at the wire body mounting portion (the connection section of the optical fiber 81 to the scanner 90) according to the movement of the robot at every unit time, calculating the forces F1 to F4 acting on each mass point 3 as described above, calculating the total of these forces, and updating the speed and the position of each mass point 3. As a result, time-series position data of each mass point 3 is obtained. Since the noted points 33 are a part of the mass points 3, the position data of the noted points 33 are also obtained.

Figure 9:
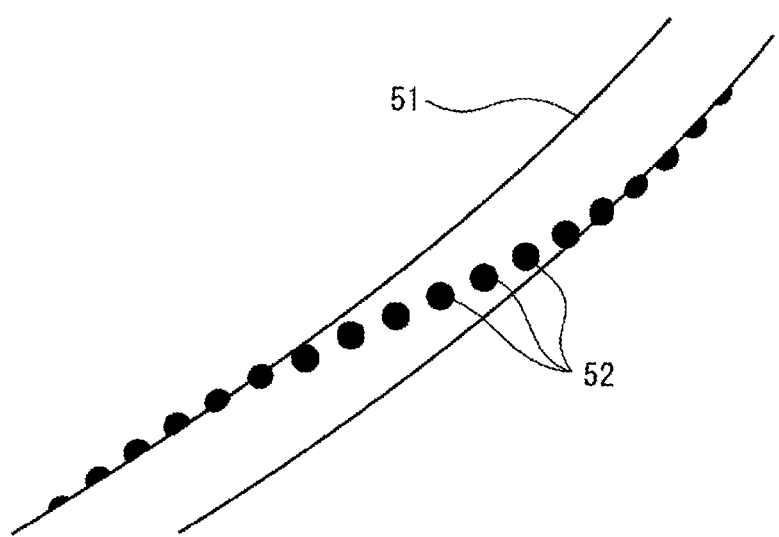
FIG. 9 is a diagram illustrating an example of an image of a wire body and noted points.

FIG. 9 is a diagram illustrating an example of the wire body image 51 in which the state of the wire body is imaged and the noted point image 52 in which the noted points are imaged, according to the simulation result. In FIG. 9, the wire body image 51 is indicated by a solid line and the noted point image 52 are indicated by black circles. Since the noted points 33 are set in a line in the longitudinal direction in the same phase in the circumferential direction of the wire body, when the wire body is twisted, the noted point image 52 is twisted on the wire body image 51 as illustrated in FIG. 9.

Figure 10:
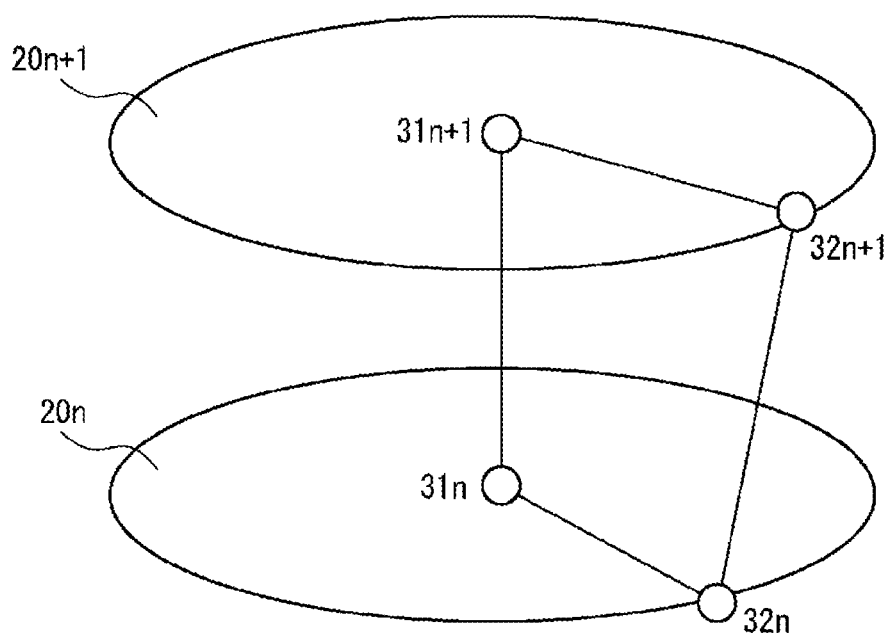
FIG. 10 is a diagram illustrating a calculation procedure of the amount of torsion in a behavior simulation of a wire body.

The torsion amount evaluating unit 164 has a function of calculating the amount of torsion in order to quantitatively express the torsion state of the wire body. FIG. 10 is a diagram describing the calculation procedure of the amount of torsion. In FIG. 10, $20n$, $20n+1$ are mutually adjacent planes of the wire body model 2 in which the mass points 3 are set, $31n$, $31n+1$ are the mass points located at the center portions of the planes $20n$, $20n+1$, respectively, and $32n$, $32n+1$ are the mass points located at the same positions (in the same phase) in the circumferential directions of the planes $20n$, $20n+1$, respectively. The mass points $32n$ and $32n+1$ are, for example, the noted points 33.

The amount of torsion of the wire body between planes $20n$, $20n+1$ can be defined by the angle between the plane formed by the mass points $31n$, $32n$, and $31n+1$ and the plane formed by the mass points $31n+1$, $32n+1$, and $31n$. As an example, a clockwise torsion is defined as plus and a counterclockwise torsion as minus toward the longitudinal tip of the wire body (scanner side). Under such a definition, the torsion amount evaluating unit 164 calculates the total amount of torsion of the optical fiber 81 whose one end is connected to the center portion of the top face 90a of the scanner 90. When the optical fiber 81 is fixed to the arm of the robot 110 at an intermediate position, the amount of torsion may be calculated between the connection end of the optical fiber 81 to the scanner 90 and the mounting position to the robot 110.

The torsion amount evaluating unit 164 evaluates the amount of torsion of the optical fiber 81 as the robot 110 moves on each path R1 to R3 (i.e., the entire operation path). For example, it is assumed that the amounts of torsion of the optical fiber 81 when the robot 110 operates on the path R1, the path R2, and the path R3 are determined to be the amounts of torsion T1, T2 and T3, respectively. The torsion amount evaluating unit 164 compares each of the amounts of torsion T1, T2, T3 with an allowable range. When the amount of torsion exceeds the predetermined allowable range, the torsion amount evaluating unit 164 subjects the operation of the robot 110 when the amount of torsion exceeds the allowable value to the orientation change (step S12).

Next, in step S13, the robot orientation changing unit 165 changes the orientation, with respect to the operation of the robot 110 exceeding allowable range of the amount of torsion. The orientation may be changed, for example, by rotating the scanner 90 about an axis parallel to the axial direction of the connection end portion 81a of the optical fiber 81 to the scanner 90 so that the optical fiber 81 is twisted in the negative direction when the torsion direction is the positive direction. The axial direction parallel to the axial direction of the connection end portion 81a is, for example, the axial direction of the connection end portion 81a or the vertical axial direction passing through the center of the top face 90a of the scanner 90.

As an example, as illustrated in FIG. 11, in a state where the robot 110 is viewed from above, it is assumed that the amount of torsion in the path R1 exceeds the allowable range in the clockwise direction, and the amount of torsion in the path R3 exceeds the allowable range in the counterclockwise direction. In this case, the robot orientation changing unit 165 changes the orientation of the robot 110 so as to rotate the scanner 90 counterclockwise (the arrow C1 direction in FIG. 11) with respect to the operation of the path R1. With respect to the operation of the path R3, the robot orientation changing unit 165 changes the orientation of the robot 110 so as to rotate the scanner 90 clockwise (arrow C2 direction in FIG. 11). The amount of orientation change in step S13, i.e., the amount of rotation of the scanner 90 may be smaller than the exceeding torsion amount over the allowable range. For example, it is assumed that the calculated torsion amount is +30 degrees and the allowable range is ±15 degrees. In this case, the exceeding torsion amount over the allowable range is +15 degrees. In this case, the orientation change amount (rotation amount) of the scanner 90 may be about minus 5 degrees. The orientation may be changed, for example, at the teaching points set at the start and end points of the path R1 for the operation of the path R1.

As a result of the orientation modification in step S13, a spot point may occur that deviates from the irradiation range before the welding time specified for the spot point ends. In step S14, such spot point is adjusted so as not to deviate from the irradiation range during welding (laser irradiation). Specifically, it is ensured that the irradiation range is not deviated during welding for the spot point by reducing the operating speed of the robot 110 or adjusting the welding timing for the spot. As an example, the welding timing can be adjusted by calculating the weldable period of each spot point again and setting the welding period of each spot point again so that the welding period does not interfere with welding periods of spot points before and after the spot point. Such adjustment processing is repeated for all spot points until no deviation from the irradiation range occurs during welding (step S14, S15).

Then, a series of processes from step S12 to step S15 (the operation of re-evaluating the torsion amount after changing the orientation of the robot) is repeated until the amount of torsion for the whole operation path of the robot 110 falls within an allowable range (step S16).

The operation program creating unit 166 creates operation programs for the robot 110 and the scanner 90 using various information including the operation path, the operating speed, and the welding period, which are generated as described above.

By the above processing, teaching (i.e., generating an operation program for executing a predetermined welding operation) in the laser machining system 100 can be performed so as to keep the amount of torsion of the optical fiber 81 within an allowable range. This prevents the optical fiber 81 from being damaged during welding by the robot 110.

Although the present invention has been described using an exemplary embodiment, those skilled in the art will appreciate that modifications and various other modifications, omissions, and additions may be made to each of the above embodiment without departing from the scope of the present invention.

In the above-described embodiment, when the amount of torsion exceeds an allowable range, the orientation of the robot is corrected, but instead of this method, or in conjunction with this method, the optical fiber 81 may be attached to the scanner 90 by twisting in a direction eliminating the amount of torsion. For example, when the torsion amount is plus 30 degrees in the behavior simulation, the optical fiber 81 may be twisted by minus 15 degrees to attach to the scanner 90 so that the torsion can be adjusted to ±15 degrees to be within the allowable range (±15 degrees). As a method for obtaining the amount of torsion of the wire body by simulation, a method known in the art other than the method illustrated in the above-described embodiment may be applied.

The above-described embodiment is not limited to the optical fiber, and can be applied to untwisting of various types of cables attached to the robot.

The program for executing various types of processing (teaching method) such as the operation program creation processing, the processing of the operation path creation and the operating speed determination, and the processing of the operating speed determination, described in the above-described embodiment can be recorded on various recording media (i.e., a semiconductor memory such as a ROM, an EEPROM, a flash memory; a magnetic recording medium; and an optical disk such as a CD-ROM, a DVD-ROM) readable by a computer.

REFERENCE SIGNS LIST

2 Wire body model
3 Mass point
4 Spring element
20 Plane
51 Wire body image
52 Noted point image
60 Laser machining teaching device
70 Robot controller
71 Operation controller
80 Laser oscillator
81 Optical fiber
81a Connection end portion
90 Scanner
90A Irradiation range
91 Controller
100 Laser machining system
110 Robot
161 Data input unit
162 Path determination unit
163 Simulation execution unit
164 Torsion amount evaluating unit 164
165 Robot orientation changing unit
166 Operation program creating unit
R1 to R3 Path

The invention claimed is:

1. A teaching device for teaching an operation of a robot of a laser machining system including a laser machining head connected to an optical fiber and the robot for moving the laser machining head,
the teaching device comprising a processor configured to:
determine an operation path of the robot based on positions of a plurality of machining points set to an object;
execute an operation simulation of the robot according to the operation path determined;
calculate an amount of torsion of the optical fiber by simulating a behavior of the optical fiber according to a movement of the robot by the operation simulation, and to evaluate the amount of torsion by comparing the amount of torsion with a predetermined allowable range; and
change an orientation of the robot so as to reduce the amount of torsion, with respect to an operation of the robot having the amount of torsion exceeding the predetermined allowable range.

2. The teaching device of claim 1, wherein
after changing the orientation of the robot, the processor repeatedly performs an operation of re-evaluating the amount of torsion until the amount of torsion of the optical fiber falls within the predetermined allowable range for an entire of the operation path.

3. The teaching device of claim 1, wherein
with respect to an operation of the robot in which a machining point is deviated, during welding, from a range of irradiation of a laser beam by the laser machining head as a result of the processor changing the orientation of the robot, the processor keeps the machining point within the range of irradiation during welding by reducing an operating speed of the robot or adjusting a welding timing at the machining point.

4. The teaching device of claim 1, wherein
the range of irradiation of a laser beam by the laser machining head is rectangular, and
the processor determines an orientation of the robot when the robot moves on the operation path, in a manner that an operation direction of the robot along the operation path is parallel to any side of the range of irradiation.

5. The teaching device of claim 1, wherein
the processor changes an orientation of the robot by rotating the laser machining head about an axis parallel to an axial direction of a connection end portion, of the optical fiber, connected to the laser machining head.

6. A teaching method for teaching an operation of a robot of a laser machining system including a laser machining head connected to an optical fiber, and the robot for moving the laser machining head, the teaching method comprising:
determining an operation path of the robot based on positions of a plurality of machining points set to an object;
executing an operation simulation of the robot according to the operation path determined;
calculating an amount of torsion of the optical fiber by simulating a behavior of the optical fiber according to a movement of the robot by the operation simulation and evaluating the amount of torsion by comparing the amount of torsion with a predetermined allowable range; and
changing an orientation of the robot so as to reduce the amount of torsion, with respect to an operation of the robot having an amount of torsion exceeding the predetermined allowable range.

7. The teaching method of claim 6, further comprising,
after changing the orientation of the robot, repeatedly performing an operation of re-evaluating the amount of torsion until the amount of torsion of the optical fiber falls within the predetermined allowable range for an entire of the operation path.

8. The teaching method of claim 6, further comprising,
with respect to an operation of the robot in which a machining point is deviated, during welding, from a range of irradiation of a laser beam by the laser machining head as a result of changing the orientation of the robot, keeping the machining point within the range of irradiation during welding by reducing an operating speed of the robot or adjusting a welding timing at the machining point.

9. The teaching method of claim 6, wherein
the range of irradiation of a laser beam by the laser machining head is rectangular, and
the method further includes determining an orientation of the robot when the robot moves on the operation path in a manner that an operation direction of the robot along the operation path is parallel to any side of the range of irradiation.

10. The teaching method of claim 6, wherein
changing an orientation of the robot is performed by rotating the laser machining head about an axis parallel to an axial direction of a connection end portion, of the optical fiber, connected to the laser machining head.

* * * * *